Jan. 17, 1933.   T. C. PEW   1,894,786
WASHING MACHINE FOR BEARINGS
Filed Feb. 2, 1931
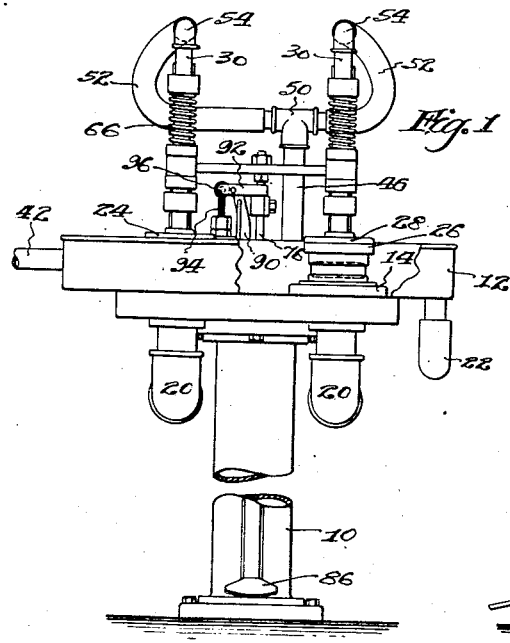
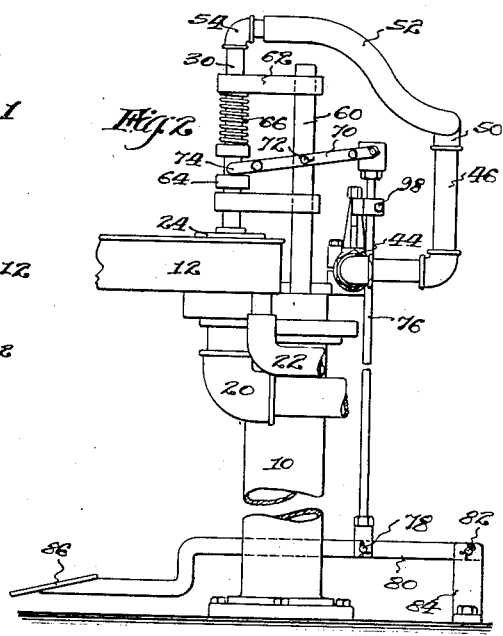

Patented Jan. 17, 1933

1,894,786

UNITED STATES PATENT OFFICE

THOMAS C. PEW, OF ANN ARBOR, MICHIGAN, ASSIGNOR TO HOOVER STEEL BALL COMPANY, OF ANN ARBOR, MICHIGAN, A CORPORATION OF MICHIGAN

WASHING MACHINE FOR BEARINGS

Application filed February 2, 1931. Serial No. 512,795.

This invention relates to machines useful in washing bearings of the roller or ball type.

Bearings, after coming from the last manufacturing stage, very often contain grit, metal filings, and the like, which if permitted to remain in the bearing would be very injurious to them. It appears desirable, therefore to wash each bearing to remove therefrom any particles, such as those above mentioned; the washing process serving also to coat the parts of the bearing with a thin film of oil, thus protecting the bearing from deterioration and injury until it is to be used as an anti-friction device.

An object of this invention, therefore, is a machine for washing bearings of the roller or ball type, such bearings usually comprising an inner race, an outer race, and rollers or balls between them, the races being rotatable with respect to each other.

A further object is a washing machine comprising a support upon which a bearing is to be placed, and a washer head which is to be moved into engagement with the bearing, the washer head having nozzles for directing streams of washing fluid or oil against the bearings, for purposes above described.

A still further object is a machine of the class above described wherein the spray nozzles are arranged to direct streams of washing fluid at angles against one of the races of the bearings, preferably the inner race, so as to cause it to rotate with respect to the other or outer race while the bearing is being washed, such rotation serving to expose all parts of the bearing to the direct force of the washing fluid nozzles.

Still further objects will readily occur to those skilled in the art upon reference to the following description and the accompanying drawing in which Fig. 1 is a front elevational view of the improved washing machine.

Fig. 2 is a side elevational view of the same.

Fig. 3 is a top plan view of a part of the machine.

Fig. 4 is an enlarged view, partly in section, of a portion of the machine.

Fig. 5 is a view of the under surface of a washer head, looking upwardly.

Fig. 6 is an enlarged sectional view of a portion of a washer head.

The washing machine shown includes a base 10, upon which there is mounted in any suitable fashion a basin 12. Disposed within the latter are a plurality of bearing supports 14, the machine shown being provided with two supports so that two bearings may be washed at one time. Each support 14, as seen in Fig. 4, is hollow and is so formed that the outer race 16 of the bearing rests upon the rim of the support, the inner race 18 of the bearing being out of engagement with any part of the support. Leading downwardly from each support is a drain pipe 20, which is supplemented by a drain pipe 22 secured to the basin, as a whole.

Disposed above the supports 14 are washing heads 24, each of which, as will be seen in Fig. 4, includes a nozzle portion 26 and a plate portion 28, there being a feed pipe 30 connected to the upper surface of the plate portion 28. The upper surface of the nozzle portion 26 is counterbored to provide a chamber 32 into which the feed pipe 30 may discharge, the chamber being discharged thru a plurality of nozzles 36 which lead therefrom to the under surface of the head. The lower rim 38 of the nozzle portion 26, as will be observed, is so formed as to engage only the outer race 16 of the bearing. Portion 26 is counterbored so that the inner race 18 of the bearing will be out of engagement with any part of the washer head.

The washer heads are disposed so as to be movable up and down with respect to the supports. When they are in their up position bearings may be placed, manually or in any other manner, upon the support and when the washer head is moved downwardly, so as to engage the bearing, streams of washing fluid will be discharged from the nozzles 36 onto the bearing, the washing fluid then being drained from the supports 14 by the drain pipes 20, and 22. The washing fluid is then conducted to suitable filters where the solid matter is removed, permitting the fluid to be used over again.

Means are provided to move the heads 24 up and down and such means will now be described. Connected to a stationary portion of the machine is the main feed pipe 42 which is provided with a valve 44 in its horizontal run. From the discharge side of the valve there projects a second stationary pipe 46, double L shaped as seen in Figs. 1 and 3, and having on its upper end a T fitting 50 (Fig. 1). Projecting from opposite sides of the T fitting are a pair of flexible pipes 52 each of which is connected to a feed pipe 30 by a suitable elbow fitting, such as the one at 54.

A standard 60, also secured to a stationary portion of the machine is provided with horizontal arms or extensions 62 and between the upper extension and a collar 64, secured to the feed pipe 30, is a coiled spring 66 which tends to expand and to force the collar 64 and with it the feed pipe 30 and the washer head 24 downwardly into bearing clamping position. Means including a link 70 pivotally mounted upon the standard 60 at 72, and connected to the collar 64 by a yoke such as the one shown at 74 are provided to elevate the washer head against the action of the spring 66, whenever desired.

The end of the link 70 is connected to a rod 76 which is pivotally connected to a foot lever 80 at 78, the latter being pivotally mounted at 82 to a portion 84 projecting upwardly from the floor upon which the washing machine is bolted. The link 80 at its front portion bears a foot pedal 86 which when depressed by the operator, causes the washer head to be moved upwardly.

Pivotally mounted upon a standard 90 is a link 92, one end of which is connected to the valve spindle 94 at the point 96 and the other of which is connected to the rod 76 at or near the point 98, the valve being so constructed that when the rod 76 is pulled downwardly and the valve stem or spindle is pulled upwardly, the valve will close, and when the coiled spring 66 is permitted to expand, pulling the rod 76 upwardly and the valve stem 94 downwardly, the valve will open.

It will be observed that an operative connection between the means which controls the movement of the washing head and the means for controlling the condition of the valve has been provided, the connection being such that the valve will be open only when the washing head is in its bearing clamping position. Accordingly, wastage of washing fluid by virtue of the valve being open at other times is prevented.

In order to insure all parts of the bearing being washed by the fluid, the nozzles 36 in the washer head portion 26, are so constructed as to provide angularly disposed streams upon all of the parts of the bearing.

Referring to Fig. 5 is will be seen that three adjacent, concentric rows of nozzles, 36a, 36b, and 36c, have been provided, the nozzles in the rows being circumferentially spaced or staggered from one another. Row 36a radially slopes downwardly and outwardly, 36b radially, is vertical, and 36c radially slopes downwardly and inwardly. Tangentially, however, rows 36b and 36c slope downwardly, for purposes to be described. The streams projecting at angles from nozzles 36b will tend to cause rotation of the balls in the bearing, and the streams from row 36c strike the inner race at such an angle as to cause the latter to revolve. Consequently, all parts of the bearings will be presented to the direct action of the streams.

The operation of the washing machine may readily be observed from the foregoing. When the operator places his foot upon the treadle 86, pulling downwardly the rod 76, washer head 24 will be elevated whereupon the operator can remove a previously washed bearing from the support replacing it by another to be washed, valve 44 being closed all the while. When he removes his foot from the treadle, spring 66 will project downwardly a washer head 24, clamping the bearing onto the support. At the same time, valve 44 will open and streams of washing fluid will be discharged from the chamber 32 from the nozzles 36 onto the bearing, washing the latter as previously described, the fluid being drained thru return pipes 20 and 22.

It will be observed that the machine which is extremely simple in construction, and efficient in operation, permits speedy and thorough washing of bearings with very little wastage of washing fluid.

Now having described the invention and the preferred embodiment thereof, it is to be understood that the said invention is to be limited, not to the specific details herein set forth, but only by the scope of the claims which follow:

What I claim is:

1. In a machine for washing bearings of the ball or roller type, the combination of a support upon which the bearing is to be placed, said support being cut away to engage only one race of the bearing, a head movable towards and away from said support and adapted, when moved towards said support, to clamp thereon a bearing, a washing fluid feedpipe leading to said head, and discharge nozzles in said head thru which fluid is to be discharged onto the bearing, the head being cut away and engaging only said one race of the bearing resting on said support.

2. In a machine for washing bearings of the ball or roller type, the combination of a support upon which the bearing is to be placed, said support being adapted to engage only one race of the bearing a head movable towards and away from said support and adapted, when moved towards said support, to clamp thereon a bearing, a washing fluid feed pipe leading to said head, and discharge nozzles in said head thru which fluid is to be discharged onto the bearing, the head being so constructed as to engage only said one race of the bearing resting on said support, the nozzles being angularly disposed so that the fluid discharged therefrom will cause rotation of the free race of the bearing.

3. In a machine for washing bearings of the ball or roller type, a basin, a plurality of supports mounted in said basin, and upon each of which a bearing is to be mounted, a plurality of heads movable towards and away from said supports to clamp bearings thereon, washing fluid feed pipes leading to said heads, discharge nozzles in said heads thru which fluid is to be discharged onto the bearings, a manifold to said feed pipes, a valve in said manifold, resilient means normally holding said heads in bearing clamping position and normally holding open said valve, and pedally operated means to move said heads away from said supports and to close said valve, whereby the valve will be open only when the heads are in position to clamp bearings in place.

4. In a machine for washing bearings having two annular races separated by friction reducing balls or rollers, means to clampingly engage one of the races and thereby support the bearing in place with that race fixed, the other race being left free to rotate, and means to discharge streams of washing fluid into and against said bearings at such angles as to cause the freely rotatable race to rotate.

In testimony whereof, I sign this specification.

THOMAS C. PEW.